(No Model.)
W. H. BORCHERS.
CAR COUPLING.
No. 486,949. Patented Nov. 29, 1892.
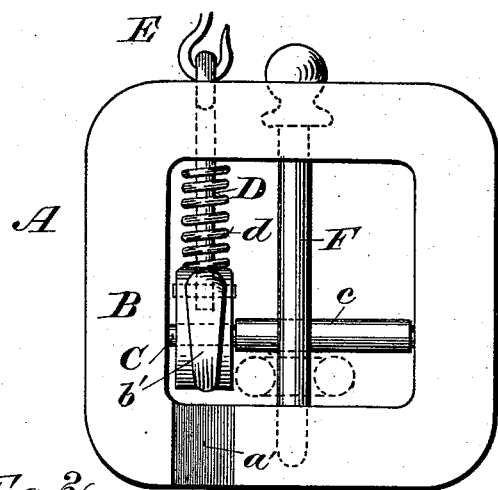
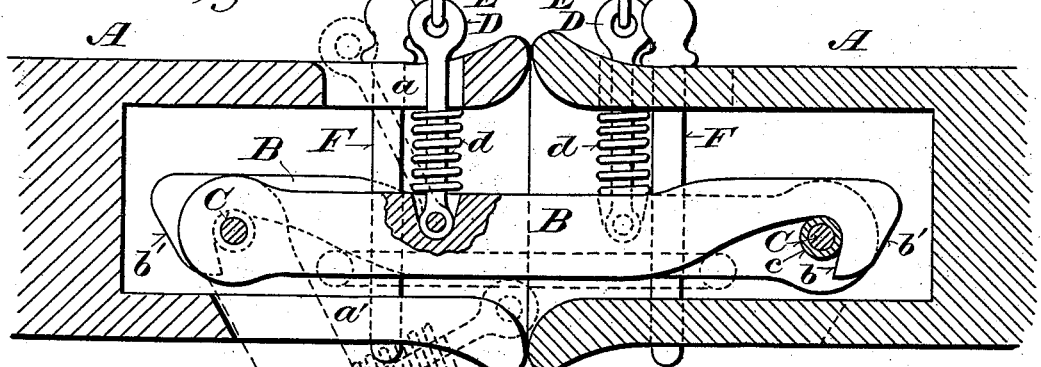
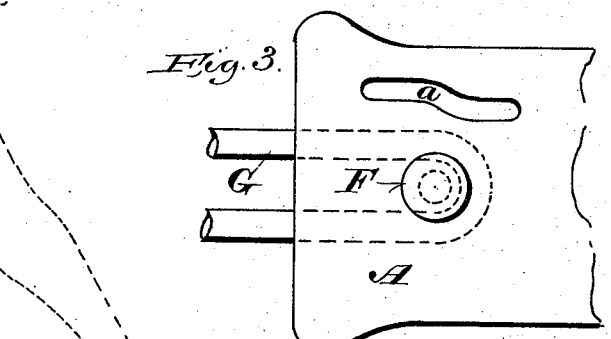
Witnesses:
E. C. Asmus
Chas. L. Goas
Inventor:
William H. Borchers,
By
Attorneys.

UNITED STATES PATENT OFFICE.

WILLIAM H. BORCHERS, OF PHEASANT BRANCH, WISCONSIN.

CAR-COUPLING.

SPECIFICATION forming part of Letters Patent No. 486,949, dated November 29, 1892.

Application filed April 25, 1892. Serial No. 430,551. (No model.)

*To all whom it may concern:*

Be it known that I, WILLIAM H. BORCHERS, of Pheasant Branch, in the county of Dane and State of Wisconsin, have invented certain new and useful Improvements in Car-Couplers; and I do hereby declare that the following is a full, clear, and exact description thereof, which will enable others skilled in the art to which it pertains to make and use the same, reference being had to the accompanying drawings, and to the letters of reference marked thereon, which form a part of this specification.

The main object of my invention is to adapt the coupling shown in United States Letters Patent No. 470,976, granted to me March 15, 1892, for use in connection with the ordinary link-and-pin coupling.

It consists of certain peculiarities of construction and arrangement hereinafter particularly described, and pointed out in the claims.

In the accompanying drawings like letters designate the same parts in the several figures.

Figure 1 is an end elevation of the coupling. Fig. 2 is a vertical longitudinal section of two couplings, showing in full lines the manner in which they are designed to be connected when both couplings embody my improvements and in dotted lines the manner of dropping the hook and employing the usual link-and-pin connection when one of the couplings is made according to my invention and the other is of another construction adapted for use with a link and pin; and Fig. 3 is a plan view of a portion of a draw-head constructed according to my invention in connection with the link and pin.

A represents a draw-head having a recess open at its outer end.

B is a hook pivoted at its inner end upon a cross-rod C, passing horizontally through said recess and secured at the ends in the draw-head. It is made to project beyond the outer end of the draw-head a sufficient distance to engage with the cross-rod C of a corresponding coupling, and is beveled at its outer end on the under side, as shown at B', so as to automatically ride over and engage with the cross-rod C of a corresponding coupling. A sleeve c, loosely mounted upon the cross-rod C and bearing at one end against said hook and at the opposite end against the inside of the draw-head, holds said hook in place in one side of the recess in the draw-head, the other side of the recess being left open for the reception of the hook of a corresponding coupling. This sleeve is made to turn freely upon the cross-rod and serves not only to hold the hook in place and strengthen and protect the rod, but also to facilitate the disengagement of the hook of another coupling, the offset or engaging surfaces of the hooks being made parallel with or tangential to their movement, so that when the couplings are subjected to draft said hooks may be readily lifted out of engagement with the sleeves c, which turn freely, and thereby facilitate the operation.

D is an eyebolt pivoted to the hook B and extending upwardly therefrom through an aperture a in the draw-head. It is connected by a rod E or other suitable connection with a lever or other device for lifting the hook from a convenient and safe position. A spiral spring d, placed around the eyebolt between the upper side of the hook and the top of the recess in the draw-head, holds said hook normally in its lower position, causing it to engage with the cross-rod C of a corresponding coupling.

The construction thus far described is the same as that shown in my prior patent above mentioned.

Inasmuch as the cars of which freight-trains are made up are oftentimes equipped with different kinds of couplings, but usually with such as are adapted for use with the ordinary link and pin, it is desirable, if not absolutely necessary in the equipment of freight-cars with new couplings, to adapt them for use with couplings of other kinds by the ordinary link-and-pin connection. For this purpose the draw-head A is formed with a longitudinal slot a' directly underneath the hook B, which is thus permitted to be dropped into the position indicated by dotted lines in Fig. 2. The aperture a, through which the eyebolt D projects, is also slotted or made of sufficient size to permit of the eyebolt being drawn through the same in lowering the hook, and the rod or other connection with the operating lever or device is made readily detachable from said eyebolt. Vertical apertures are formed in the draw-head in the usual manner for the reception of a coupling-pin F, by means of which and an ordinary link G the coupling may be connected in the ordinary manner with any other form of coupling adapted for use with a link-and-pin connection.

The use of the link-and-pin connection with my improved coupling brings the cars coupled thereby about a foot nearer together than when they are coupled with the ordinary link-and-pin couplings in general use, rendering it less dangerous to pass from one car to another.

I claim—

1. In a car-coupler, the combination of a draw-head having an outwardly-opening recess in the end, a vertically-swinging hook hinged on a cross-rod passing horizontally through said recess, a rod pivoted to said hook within said recess and passing vertically through the draw-head, and a spring interposed between said hook and the upper part of the draw-head and holding said hook normally in its lower position, said draw-head having a vertical slot in the under side below said hook and provided with a vertical aperture for a coupling-pin, whereby said hook may be disconnected and dropped out of the way and the coupling employed with an ordinary link-and-pin connection, substantially as and for the purposes set forth.

2. In a car-coupler, the combination of a draw-head having an outwardly-opening recess in the end, a vertically-swinging hook hinged on a cross-rod passing horizontally through said recess and having its offset or engaging surface in a plane approximately parallel with its vertical movement, the opposite side of said recess being left open for the reception of the hook of a corresponding coupling, a rod pivoted to said hook and having a suitable connection for raising said hook, and a spring holding said hook normally in its lower position, said draw-head having a vertical slot in the under side below said hook, which may be lowered through the same out of the way for the purpose of using an ordinary link-and-pin connection, substantially as and for the purposes set forth.

3. In a car-coupler, the combination of a draw-head having an outwardly-opening recess, a vertically-swinging hook hinged in one side of said recess on a cross-rod passing horizontally through the same, and a detachable connection for holding said hook in operative position, said draw-head having a vertical perforation for a coupling-pin, and a vertical slot in the under side extending from the outer end inwardly below said hook, which may be dropped through the same, thereby adapting said coupling for use with an ordinary link-and-pin connection, substantially as and for the purposes set forth.

In testimony that I claim the foregoing as my own I affix my signature in presence of two witnesses.

WILLIAM H. BORCHERS.

Witnesses:
CHARLES M. MORRIS,
A. T. BOWEN.